(12) United States Patent
Zhang et al.

(10) Patent No.: US 12,082,022 B2
(45) Date of Patent: Sep. 3, 2024

(54) APPARATUS AND METHOD FOR USER EQUIPMENT PANEL SELECTION

(71) Applicant: Intel Corporation, Santa Clara, CA (US)

(72) Inventors: Yushu Zhang, Beijing (CN); Guotong Wang, Beijing (CN); Alexei Davydov, Nizhny Novgorod (RU); Gang Xiong, Portland, OR (US); Bishwarup Mondal, San Ramon, CA (US); Hong He, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 17/252,223

(22) PCT Filed: Sep. 20, 2019

(86) PCT No.: PCT/CN2019/106842
§ 371 (c)(1),
(2) Date: Dec. 14, 2020

(87) PCT Pub. No.: WO2020/063457
PCT Pub. Date: Apr. 2, 2020

(65) Prior Publication Data
US 2021/0258811 A1   Aug. 19, 2021

(30) Foreign Application Priority Data

Sep. 27, 2018   (WO) ................ PCT/CN2018/107940

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0048* (2013.01); *H04W 72/044* (2013.01); *H04W 72/1268* (2013.01); *H04B 7/0695* (2013.01)

(58) Field of Classification Search
CPC ............... H04W 24/10; H04W 72/044; H04W 72/1268; H04W 48/16; H04L 5/0048;
(Continued)

(56) References Cited

U.S. PATENT DOCUMENTS 10,581,503 B2 *   3/2020   Chang ................. H04B 7/0413
11,026,233 B2 *   6/2021   Zhang .................. H04L 5/0044
(Continued)

FOREIGN PATENT DOCUMENTS

CN          108112030 A        6/2018
WO     WO-2017067138 A1 *   4/2017   ........... H04B 7/0413
(Continued)

OTHER PUBLICATIONS

International Patent Office—International Search Report and Written Opinion mailed Dec. 9, 2019 from International Application No. PCT/CN2019/106842, 9 pages.

*Primary Examiner* — Justin T Van Roie
(74) *Attorney, Agent, or Firm* — Schwabe, Williamson & Wyatt, P.C.

(57) ABSTRACT

Provided herein are apparatus and method for user equipment (UE) panel selection. The disclosure provides an apparatus for a UE, comprising: a radio frequency (RF) interface to receive one or more reference signal resources from a next generation NodeB (gNB); and processor circuitry coupled with the RF interface, the processor circuitry to: determine a beam quality for each of the one or more reference signal resources received at each panel of the UE; and report beam information to the gNB, the beam information to indicate the beam quality of each of the one or
(Continued)

more reference signal resources and corresponding panel for receiving each of the one or more reference signal resources. Other embodiments may also be disclosed and claimed.

20 Claims, 11 Drawing Sheets

(51) Int. Cl.
*H04W 72/044* (2023.01)
*H04W 72/1268* (2023.01)
*H04B 7/06* (2006.01)

(58) Field of Classification Search
CPC ... H04L 5/0057; H04B 7/0695; H04B 7/0404; H04B 7/0691; H04B 7/088
See application file for complete search history.

(56) References Cited

U.S. PATENT DOCUMENTS

| | | | |
|---|---|---|---|
| 11,139,878 B2* | 10/2021 | Wang | H04B 7/0404 |
| 2018/0227094 A1* | 8/2018 | Liu | H04W 72/046 |
| 2019/0230545 A1* | 7/2019 | Liou | H04W 76/19 |
| 2021/0119688 A1* | 4/2021 | Enescu | H04W 72/046 |

FOREIGN PATENT DOCUMENTS

| | | | |
|---|---|---|---|
| WO | 2018107029 A1 | 6/2018 | |
| WO | 2018149283 A1 | 8/2018 | |

* cited by examiner

400

```
┌─────────────────────────────────────────────────────┐  ╭ 410
│ determining a beam quality for each of one or more  │
│ reference signal resources received from an AN at   │
│ each panel of the UE                                │
└─────────────────────────────────────────────────────┘
                           │
                           ▼
┌─────────────────────────────────────────────────────┐  ╭ 420
│         reporting beam information to the AN        │
└─────────────────────────────────────────────────────┘
                           ┆
                           ▼
┌─────────────────────────────────────────────────────┐  ╭ 430
│         receiving a beam indication from the AN     │
└─────────────────────────────────────────────────────┘
                           ┆
                           ▼
┌─────────────────────────────────────────────────────┐  ╭ 440
│         applying a panel for uplink transmission    │
└─────────────────────────────────────────────────────┘
```

Fig. 4

| Bits | (00) | (10) | (01) | (11) |
|---|---|---|---|---|
| Panel 1 | Deactivated | Activated | Deactivated | Activated |
| Panel 2 | Deactivated | Deactivated | Activated | Activated |

APPARATUS AND METHOD FOR USER EQUIPMENT PANEL SELECTION

PRIORITY CLAIM

This application is a national phase entry under 35 U.S.C. § 371 of International Application No. PCT/CN2019/106842, filed Sep. 20, 2019, entitled "APPARATUS AND METHOD FOR USER EQUIPMENT PANEL SELECTION," which claims priority to the International Application No. PCT/CN2018/107940 filed on Sep. 27, 2018, the entire disclosures of which are hereby incorporated by reference.

TECHNICAL FIELD

Embodiments of the present disclosure generally relate to wireless communications, and in particular to an apparatus and a method for user equipment (UE) panel selection.

BACKGROUND ART

Explosive wireless traffic growth leads to an urgent need of both communication rate and capacity improvements. In order to improve the rate and capacity of wireless communication, technologies related to Multiple Input Multiple Output (MIMO) communications between a base station (such as, a next generation NodeB, which may be abbreviated as gNodeB or gNB) and a terminal (such as, a UE) have emerged.

SUMMARY

An aspect of the disclosure provides an apparatus for a UE, comprising: a radio frequency (RF) interface to receive one or more reference signal resources from a next generation NodeB (gNB); and processor circuitry coupled with the RF interface, the processor circuitry to: determine a beam quality for each of the one or more reference signal resources received at each panel of the UE; and report beam information to the gNB, the beam information to indicate the beam quality of each of the one or more reference signal resources and corresponding panel for receiving each of the one or more reference signal resources.

An aspect of the disclosure provides an apparatus for a gNB, comprising: a RF interface to transmit one or more reference signal resources to a UE; and processor circuitry coupled with the RF interface, the processor circuitry to: decode beam information received from the UE, the beam information to indicate a beam quality of each of the one or more reference signal resources as received at a UE panel and the corresponding UE panel for receiving each of the one or more reference signal resources; and encode a beam indication based on the received beam information, the beam indication to indicate a reference signal resource of the one or more reference signal resources.

An aspect of the disclosure provides an apparatus for a gNB, comprising: a RF interface to communicate with a UE; and processor circuitry coupled with the RF interface, the processor circuitry to: determine whether a panel of the UE is activated or deactivated based on the communication with the UE; and schedule a panel of the UE for uplink transmission taking the determination into consideration.

BRIEF DESCRIPTION OF THE DRAWINGS

Embodiments of the disclosure will be illustrated, by way of example and not limitation, in the figures of the accompanying drawings in which like reference numerals refer to similar elements.

FIG. 4 illustrates a flowchart of a method for UE panel selection in accordance with various embodiments of the disclosure.

DETAILED DESCRIPTION OF EMBODIMENTS

Figure 1:
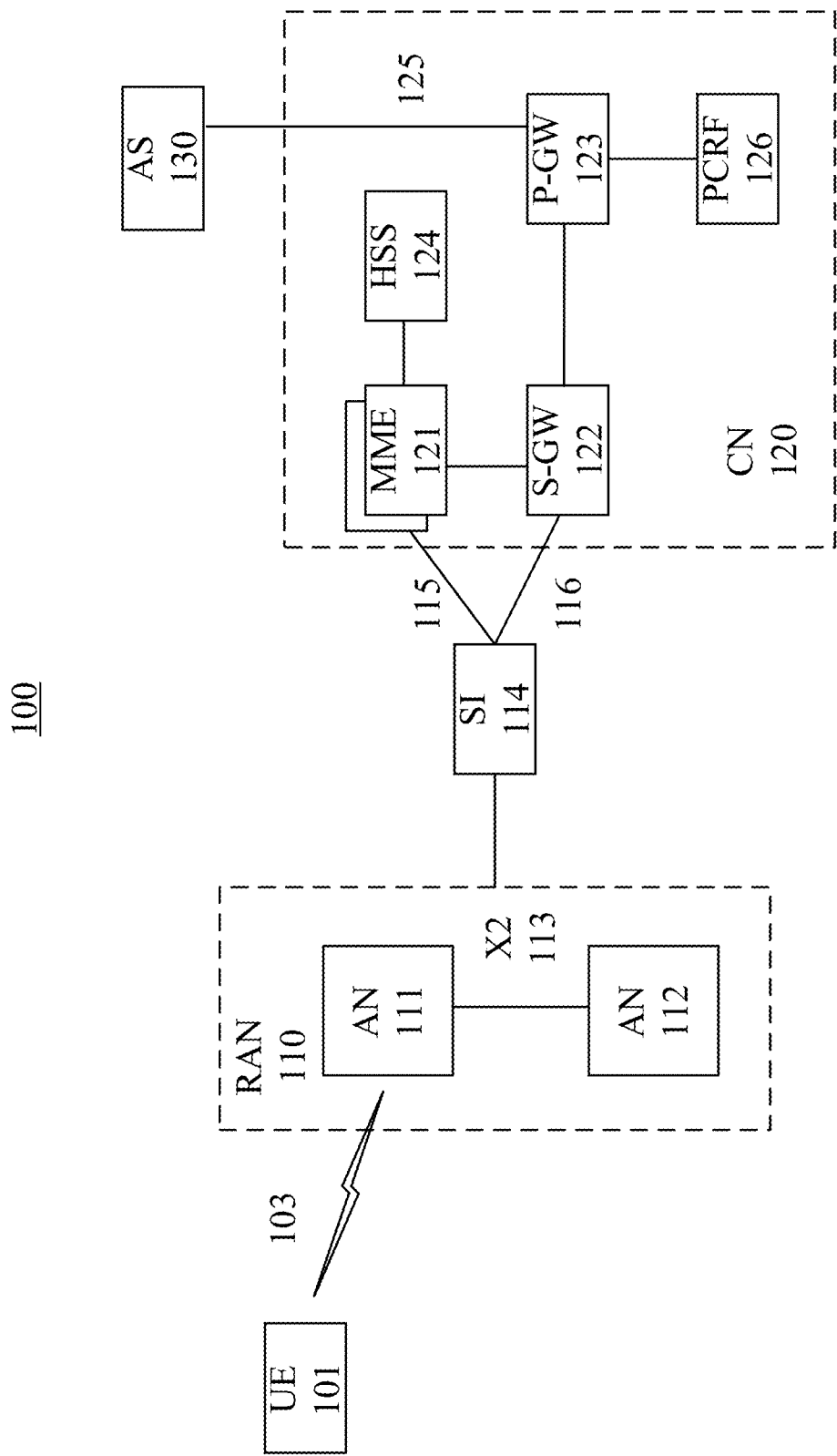
FIG. 1 illustrates a communication system in accordance with some embodiments of the disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)".

Under circumstances of MIMO communications, a UE may include one or more antenna port(s) groups, each of which may be considered as a panel.

Beam management between a gNB and a UE has been specified in 3GPP Rel-15. For uplink beam management, the gNB can indicate to the UE, a transmitting (Tx) beam for an uplink channel, for example, physical uplink shared channel (PUSCH) or physical uplink control channel (Physical uplink control channel), or a sounding reference signal (SRS), based on spatial relation information (for example, the radio resource control (RRC) parameter *PUCCH-spatialrelationinfo*, as defined in the Third Generation Partnership Project (3GPP) Technical Specification (TS) 38.331 Release 15 (V15.3.0, September 2018)). The spatial relation information may include any of the following reference signal resources: a synchronization signal block (SSB), a channel state information reference signal (CSI-RS) or a sounding reference signal (SRS), for example, as determined by the gNB itself.

For the SRS, it has been defined that SRS resources from different SRS resource sets may be transmitted simultaneously, and one SRS resource set may correspond to one panel, i.e., one UE antenna port group. That is to say, SRS resources from different SRS resource sets should correspond to different panels. As a result, when the SRS is used for uplink beam indication, it is easy to know which panel an uplink signal is from.

However, when either the SSB or CSI-RS is used by the gNB for uplink beam indication, since different SSB/CSI-RS resources from different SSB/CSI-RS resource sets may have the same index, the UE may use the same beam to receive the different SSB/CSI-RS resources with the same index and may use the same beam to transmit uplink channels or signals corresponding to the different SSB/CSI-RS resources with the same index. As a result, it is unclear which panel each of the uplink signals is from.

The present disclosure provides solutions to enable uplink UE panel selection in the case that the SSB or CSI-RS are used for uplink beam indication. In order to support the SSB/CSI-RS-based UE panel selection, the solutions need to provide approaches for the UE to report its panel information for corresponding SSB/CSI-RS to the gNB and/or approaches for the UE to determine when to apply a corresponding panel for the SSB/CSI-RS, for example.

In the disclosure, embodiments related to uplink UE panel selection will be discussed. These and other embodiments for will be described in more details herein.

FIG. 1 illustrates a communication system 100 in accordance with some embodiments of the disclosure. The communication system 100 is shown to include a user equipment (UE) 101, for example. The UE 101 is illustrated a smartphone (e.g., a handheld touchscreen mobile computing device connectable to one or more cellular networks). However, the UE 101 may also include any mobile or non-mobile computing device, such as a personal data assistant (PDA), a tablet, a pager, a laptop computer, a desktop computer, a wireless handset, or any computing device including a wireless communications interface.

In some embodiments, the UE 101 may include an Internet of Things (IoT) UE, which may include a network access layer designed for low-power IoT applications utilizing short-lived UE connections. An IoT UE may utilize technologies such as machine-to-machine (M2M), machine-type communications (MTC), enhance MTC (eMTC), and narrow band IoT (NB-IoT) for exchanging data with an IoT server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 101 may be configured to connect, e.g., communicatively couple, with a radio access network (RAN) 110, which may be, for example, an Evolved Universal Mobile Telecommunications System (UMTS) Terrestrial Radio Access Network (E-UTRAN), a NextGen RAN (NG RAN), or some other type of RAN. The UE 101 may operate in consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 110 may include one or more access nodes (ANs). These ANs may be referred to as base stations (BSs), NodeBs, evolved NodeBs (eNBs), next Generation NodeBs (gNBs), transmission reception point (TRP), remote radio head (RRH), and so forth, and may include ground stations (e.g., terrestrial access points) or satellite stations providing coverage within a geographic area (e.g., a cell). As shown in FIG. 1, for example, the RAN 110 may include AN 111 and AN 112.

The UE 101 may communicatively couple with the RAN 110 by utilizing a connection 103 with AN 111, as shown in FIG. 1. The connection 103 may be implemented with one or more beams (not shown). A beam may indicate a spatial domain transmission and/or reception filter or spatial relation, and thus, term "beam", "spatial domain transmission and/or reception filter" and "spatial relation" may be interchangeable herein.

The AN 111 and AN 112 may communicate with one another via an X2 interface 113. The AN 111 and AN 112 may be macro ANs which may provide lager coverage. Alternatively, they may be femtocell ANs or picocell ANs, which may provide smaller coverage areas, smaller user capacity, or higher bandwidth compared to a macro AN. For example, one or both of the AN 111 and AN 112 may be a low power (LP) AN. In an embodiment, the AN 111 and AN 112 may be the same type of AN. In another embodiment, they are different types of ANs.

The AN 111 may terminate the air interface protocol and may be the first point of contact for the UE 101. In some embodiments, the ANs 111 and 112 may fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UE 101 may be configured to communicate using Orthogonal Frequency-Division Multiplexing (OFDM) communication signals with the AN 111 or with other UEs over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Proximity-Based Service (ProSe) or sidelink communications), although the scope of the embodiments is not limited in this respect. The OFDM signals can include a plurality of orthogonal subcarriers.

In some embodiments, a downlink resource grid may be used for downlink transmissions from the AN 111 to the UE 101, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

Downlink channels may include a physical downlink shared channel (PDSCH) and a physical downlink control channel (PDCCH).

The PDSCH may carry user data and higher-layer signaling to the UE 101. The PDCCH may carry information about the transport format and resource allocations related to the PDSCH channel, among other things. It may also inform the UE 101 about the transport format, resource allocation, and Hybrid Automatic Repeat Request (HARQ) information related to the uplink shared channel. Typically, downlink scheduling (assigning control and shared channel resource blocks to the UE 101 within a cell) may be performed at the AN 111 based on channel quality information fed back from the UE 101. The downlink resource assignment information may be sent on the PDCCH used for (e.g., assigned to) the UE 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8)

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

Uplink channels may include a physical uplink shared channel (PUSCH) and a physical uplink control channel (PUCCH). The PUSCH may carry user data and control information to the AN(s), and the PUCCH may carry control information to the AN(s).

The RAN 110 is shown to be communicatively coupled to a core network (CN) 120 via a S1 interface 114. In some embodiments, the CN 120 may be an evolved packet core (EPC) network, a NextGen Packet Core (NPC) network, or some other type of CN. In an embodiment, the S1 interface 114 is split into two parts: the S1-mobility management entity (MME) interface 115, which is a signaling interface between the ANs 111 and 112 and MMEs 121; and the S1-U interface 116, which carries traffic data between the ANs 111 and 112 and a serving gateway (S-GW) 122.

In an embodiment, the CN 120 may comprise the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc.. For example, the HSS 124 can provide support for routing/roaming, authentication, authorization, naming/addressing resolution, location dependencies, etc.

The S-GW 122 may terminate the S1 interface 114 towards the RAN 110, and route data packets between the RAN 110 and the CN 120. In addition, the S-GW 122 may be a local mobility anchor point for inter-AN handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the CN 120 and external networks, such as a network including an application server (AS) 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In an embodiment, the P-GW 123 is communicatively coupled to an application server 130 via an IP communications interface. The application server 130 may also be configured to support one or more communication services (e.g., Voice-over-Internet Protocol (VoIP) sessions, PTT sessions, group communication sessions, social networking services, etc.) for the UE 101 via the CN 120.

The P-GW 123 may further be responsible for policy enforcement and charging data collection. Policy and Charging Rules Function (PCRF) 126 is a policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with an appropriate traffic flow template (TFT) and QoS class of identifier (QCI), which commences the QoS and charging as specified by the application server 130.

The quantities of devices and/or networks illustrated in FIG. 1 are provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of system 100 may perform one or more functions described as being performed by other one or more of the devices of system 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
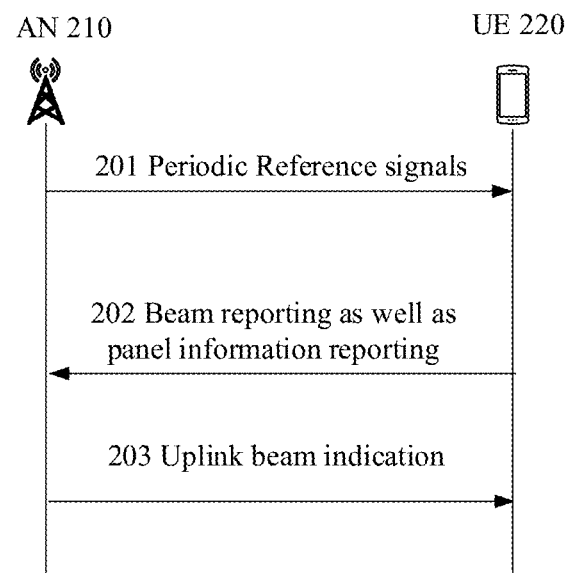
FIG. 2 illustrates a schematic diagram showing a procedure for uplink UE panel selection in accordance with some embodiments of the disclosure.

FIG. 2 illustrates a schematic diagram showing a procedure 200 for uplink UE panel selection in accordance with some embodiments of the disclosure. The procedure 200 is described to be performed between an AN 210 (e.g., AN 111 or AN 112) and a UE 220 (e.g. UE 101), for example. In some embodiments, the AN 210 may be a gNB. In some embodiments, the UE 220 may include one or more antenna port(s) groups. Messages are transferred between the AN 210 and UE 220 in a manner as described in reference with FIG. 1. For brevity and clarity, some well-known data exchanges between the AN 210 and UE 220 are omitted, so as not to obscure the subject matter of the present application.

At 201, the AN 210 may transmit one or more reference signals to the UE 220 periodically. In an embodiment, the reference signals may be indicated by reference signal resources. As an example, the reference signal resources may be SSB resources. As another example, the reference signal resources may be CSI-RS resources. In other examples, the reference signal resources may include any other reference signal resources, as long as they can have the same functions as the SSB/CSI-RS resources.

At 202, the UE 220 may perform beam reporting as well as panel information reporting, so as to inform the AN 210 of corresponding beam information. In an embodiment, the beam information may indicate a beam quality of each of the one or more reference signal resources and corresponding panel for receiving each of the one or more reference signal resources. For example, the beam information may include one or more information elements (IEs). Each of the IEs may include an index of a reference signal resource of the one or more reference signal resources as configured by the AN 210, an index of a panel for receiving the reference signal resource, and a beam quality of the reference signal resource as received at the panel.

As user herein, the term "panel" may be used to refer to a UE antenna port(s) group, which may also called as "UE panel". That is to say, in embodiments of the present application, phrases such as "panel", "UE panel", and "UE antenna port(s) group" are used interchangeably.

In case that the one or more reference signal resources are CSI-RS resources, each of the IEs of the beam information may be configured to include a downlink reference signal index, such as, a SSB resource index (SSBRI); an index of a panel of the UE for receiving the corresponding SSB resource; and a beam quality of the SSB resource as received at the panel.

In case that the one or more reference signal resources are SSB resources, each of the IEs of the beam information may be configured to include a downlink reference signal index, such as, a CSI-RS resource index (CRI); an index of a panel of the UE for receiving the corresponding CSI-RS resource; and a beam quality of the CSI-RS resource as received at the panel.

For example, the SSBRI or CRI may be configured by the AN 210.

In an embodiment, the index of the panel may be based on a bitmap. For example, when the UE 220 has two panels, a bitmap of 2 bits may be used to indicate UE panel indexes, where "10" may indicate UE Panel 1, "01" may indicate UE Panel 2, and "11" may indicate UE Panel 1 and UE Panel 2.

In another embodiment, the index of the panel may be indicated by a higher layer signaling, such as, RRC signaling.

In the above embodiments, the reported beam quality is measured from the panel as indicated by the corresponding UE panel index. For example, the beam quality may be based on a Layer 1 Reference Signal Receiving Received Power (L1-RSRP), a Layer 1 Signal to Interference plus Noise Ratio (L1-SINR), or a Layer 1 Reference Signal Received Quality (L1-RSRQ).

At 203, the AN 210 may transmit an uplink beam indication to the UE 220. For example, the AN 210 may transmit the uplink beam indication in a downlink reference signal. For example, the uplink beam indication may be included in an information element (IE) of the downlink reference signal, such as, *PUCCH-SpatialRelationInfo*. In an embodiment, the uplink beam indication may include an index of a reference signal resource (which belongs to the reference signal resources as transmitted by the AN 210 at 201), for example, a SSBRI or a CRI. In another embodiment, the uplink beam indication may include an index of a reference signal resource as well as an index of an intended UE panel. For example, if UE Panel 1 has the optimal beam quality for reference signal resource 0 (e.g., SSB=0) based on the reported beam information, and the uplink beam indication may include only (SSB=0), or alternatively (SSB=0, panel=1).

In an embodiment, the RRC parameter *PUCCH-spatialrelationinfo*, specified in 3GPP TS 38.331 (V15.3.0, September 2018)), may be configured as below, when the UE includes, for example, two panels.

```
ASN1START
-- TAG-PUCCH-SPATIALRELATIONINFO-START
PUCCH-SpatialRelationInfo ::=      SEQUENCE {
    pucch-SpatialRelationInfoId    PUCCH-SpatialRelationInfoId,
    servingCellId                  ServCellIndex      OPTIONAL,         -- Need S
```

-continued

```
UEAntennaPortsGroupIndex            ENUMERATED {group0, group1, group0_1}
   OPTIONAL,
   referenceSignal                  CHOICE {
      ssb-Index                     SSB-Index,
      csi-RS-Index                  NZP-CSI-RS-ResourceId,
      srs              SEQUENCE {
                          resource      SRS-ResourceId,
                          uplinkBWP       BWP-Id
                       }
   },
   pucch-PathlossReferenceRS-Id     PUCCH-PathlossReferenceRS-Id,
   p0-PUCCH-Id                      P0-PUCCH-Id,
   closedLoopIndex                  ENUMERATED { i0, i1 }
}
PUCCH-SpatialRelationInfold ::=     INTEGER (1..maxNrofSpatialRelationInfos)
-- TAG-PUCCH-SPATIALRELATIONINFO-STOP
-- ASN1STOP
```

As shown, when SSB or CSI-RS is selected in *referenceSignal*, the *PUCCH-spatialrelationinfo* may include *UEAntennaPortsGroupIndex* to denote an index of UE panel.

Figure 3:
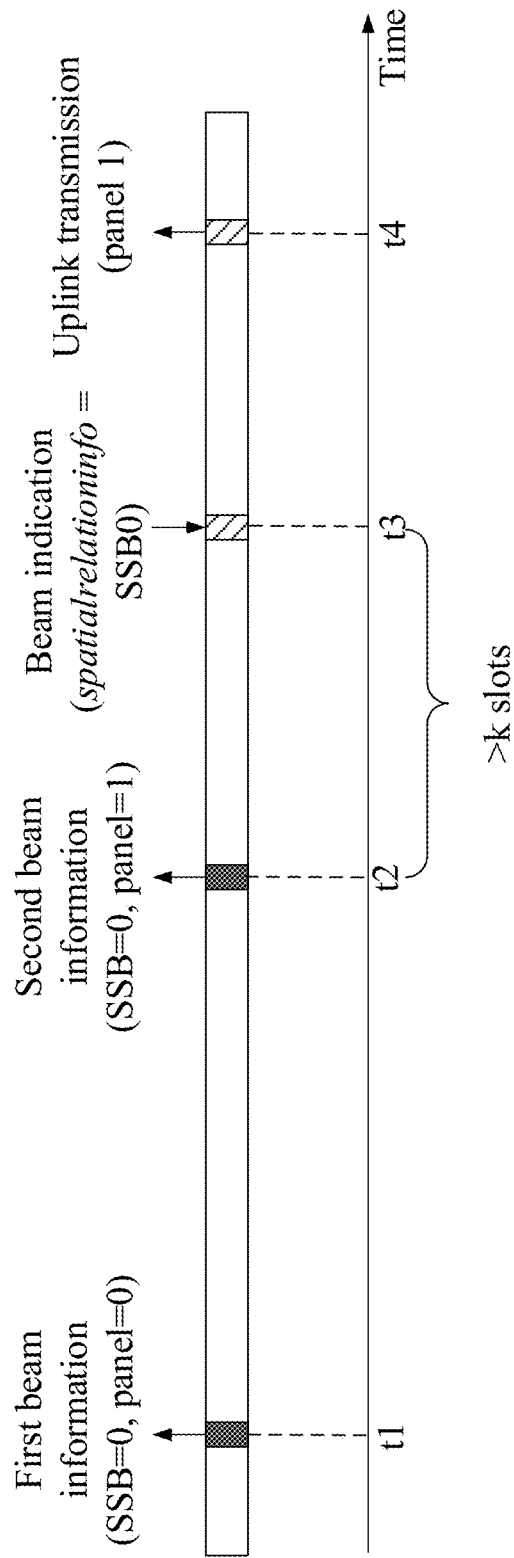
FIG. 3 illustrates an exemplary timing diagram illustrating a process for UE panel selection in accordance with some embodiments of the disclosure.

The UE 220 may use the panel for corresponding uplink transmission, either as indicated by the uplink beam indication or as reported in the beam information. Regarding approaches for the UE 220 to determine when to apply the panel for corresponding uplink transmission, FIG. 3 shows an exemplary timing diagram illustrating a process 300 for UE panel selection in accordance with some embodiments of the disclosure. As shown in FIG. 3, the SSB signals are taken as an example to illustrate the process 300 for UE panel selection. In other embodiments, CSI-RS resources or other reference signal resources may be used, which is not limited herein.

At time t1, a UE (e.g. UE 101) reports first beam information to an AN (e.g., AN 111 or AN 112). The first beam information indicates that for SSB=0, UE panel 0 (panel=0) should be used for uplink transmission, i.e., SSB=0, panel=0, for example.

At time t2, the UE reports second beam information to the AN. The second beam information indicates that for SSB=0, UE Panel 1 (panel=1) should be used for uplink transmission, i.e., SSB=0, panel=1, for example.

At time t3, the AN transmits a beam indication to the UE. The beam indication indicates that corresponding spatial relation information is SSB0, i.e, *spatialrelationinfo*=SSB0.

At time t4, the UE applies its Panel 1 for uplink transmission.

In the embodiment, there should be more than a particular number (k) of slots between t2 and t3, for example, k=4. The value of k may be configured by a higher layer signaling or be predefined.

Based on the process 300, the UE can apply (at t4) the panel for the indicated SSB/CSI-RS in the latest beam reporting instance (at t2) for the corresponding SSB/CSI-RS, and the latest beam reporting instance happens k slots before the reception of the beam indication, where k is configured by a higher layer signaling or predefined.

The UE may update the panel for corresponding uplink signal based on spatial relation information configured by SSB/CSI-RS after each beam reporting instance. Alternatively, the UE may update the panel for corresponding uplink signal only after receiving a beam indication from the CN.

Referring to FIG. 4, illustrated is a flowchart of a method 400 for UE panel selection, in accordance with various embodiments of the disclosure. In some aspects, the method 400 can be performed by the UE 101 of FIG. 1. In other aspects, a machine-readable storage medium may store instructions associated with method 400, which when executed can cause a UE to perform the method 400. In embodiments, the UE may include one or more antenna port(s) groups, i.e., panels.

The method 400 may include, at 410, determining a beam quality for each of one or more reference signal resources received from an AN (e.g., the ANs 111 or 112 of FIG. 1) at each panel of the UE. In an embodiment, the one or more reference signal resources may be SSB resources. In another embodiment, the one or more reference signal resources may be CSI-RS resources. In other embodiments, other reference signal resources may be included, which is not limited herein. In the embodiments, the beam quality may be determined based on any of L1-RSRP, L1-SINR, or L1-RSRQ.

The method 400 may include, at 420, reporting beam information to the AN. The beam information may indicate the beam quality of each of the one or more reference signal resources as well as corresponding panel for receiving each of the one or more reference signal resources. For example, the beam information may include one or more information elements (IEs), each of which may include an index of a reference signal resource of the one or more reference signal resources, an index of a panel for receiving the reference signal resource, and a beam quality of the reference signal resource as received at the panel. In particular, each of the IEs may include an SSBRI or a CRI, an index of a panel for receiving the corresponding SSB resource or CSI-RS resource, and a beam quality of the SSB resource or CSI-RS resource as received at the panel.

Optionally, the method 400 may include, at 430, receiving a beam indication from the AN. The beam indication may indicate a reference signal resource of the one or more reference signal resources. For example, the beam indication may include an SSBRI or a CRI. Alternatively, the beam indication may include an SSBRI or a CRI, as well as an index of UE panel.

Optionally, the method 400 may include, at 440, applying a panel for uplink transmission. In an embodiment, the panel for uplink transmission may be a panel corresponding to the reference signal resource indicated in the beam indication. The correspondence between the panel and the reference signal resource may be indicated in the beam information as reported. In another embodiment, the panel for uplink transmission may be indicated by the beam indication explicitly.

In some embodiments, the UE may perform 440 after a number of slots (e.g., 4 slots) since performance of 420. The number of slots may be configured by a higher layer signaling (e.g., RRC signaling) or be predefined.

Figure 5:
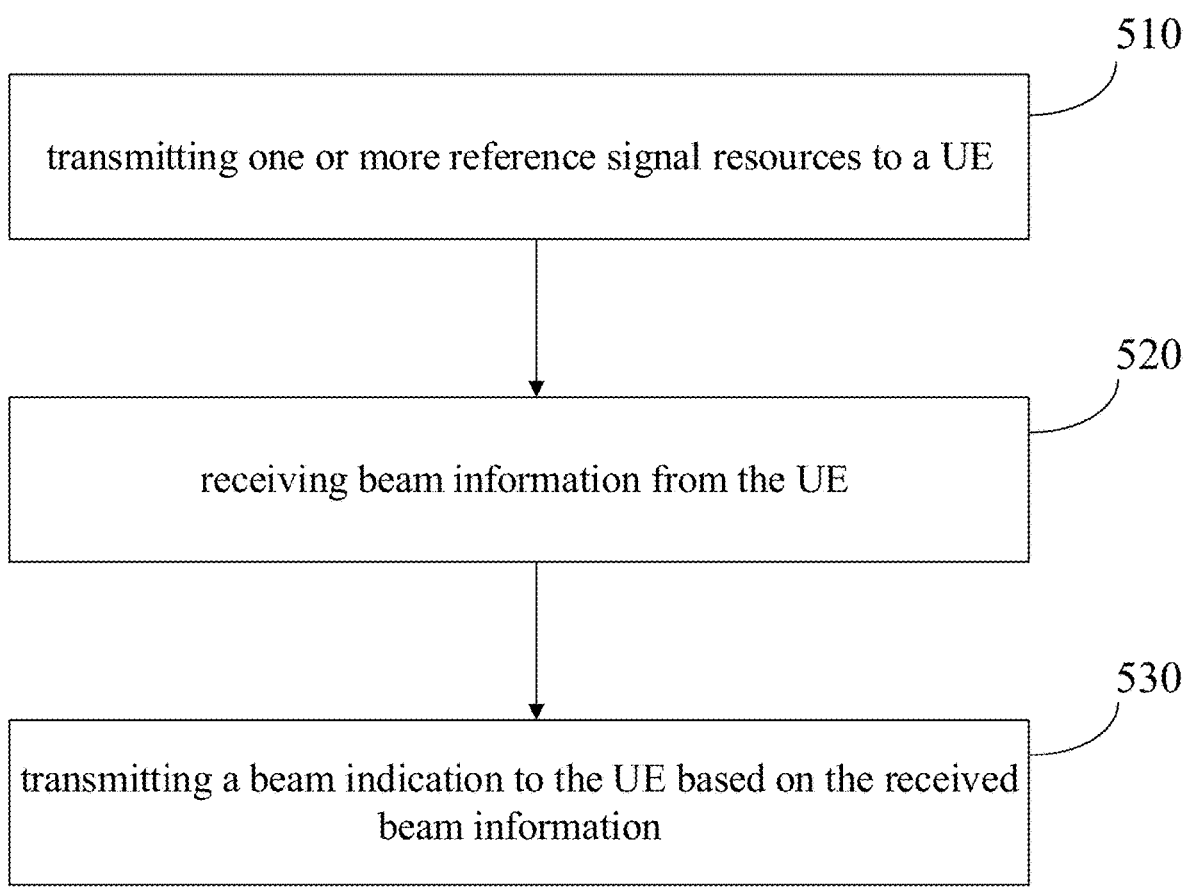
FIG. 5 illustrates a flowchart of a method for UE panel selection in accordance with various embodiments of the disclosure.

Referring to FIG. 5, illustrated is a flowchart of a method 500 for UE panel selection, in accordance with various embodiments of the disclosure. In some aspects, the method 500 can be performed by the ANs 111 or 112 of FIG. 1. In other aspects, a machine-readable storage medium may store instructions associated with method 500, which when executed can cause an AN or a gNB to perform the method 500.

The method 500 may include, at 510, transmitting one or more reference signal resources to a UE. In an embodiment, the one or more reference signal resources may be SSB resources. In another embodiment, the one or more reference signal resources may be CSI-RS resources. In other embodiments, other reference signal resources may be included, which is not limited herein.

The method 500 may include, at 520, receiving beam information from the UE. The beam information may indicate a beam quality of each of the one or more reference signal resources as well as a corresponding panel of the UE for receiving each of the one or more reference signal resources. For example, the beam information may include one or more information elements (IEs), each of which may include an index of a reference signal resource of the one or more reference signal resources, an index of a panel for receiving the reference signal resource, and a beam quality of the reference signal resource as received at the panel. In particular, each of the IEs may include an SSBRI or a CRI, an index of a panel of the UE for receiving the corresponding SSB resource or CSI-RS resource, and a beam quality of the SSB resource or CSI-RS resource as received at the panel of the UE.

The method 500 may include, at 530, transmitting a beam indication to the UE based on the received beam information. The beam indication may indicate a reference signal resource of the one or more reference signal resources. For example, the beam indication may include an SSBRI or a CRI. Alternatively, the beam indication may include an SSBRI or a CRI, as well as an index of UE panel. In an embodiment, the beam indication may be transmitted in a downlink reference signal, which may include, for example, the *PUCCH-SpatialRelationInfo* IE as shown by Table 1 or Table 2 above.

Figure 6:
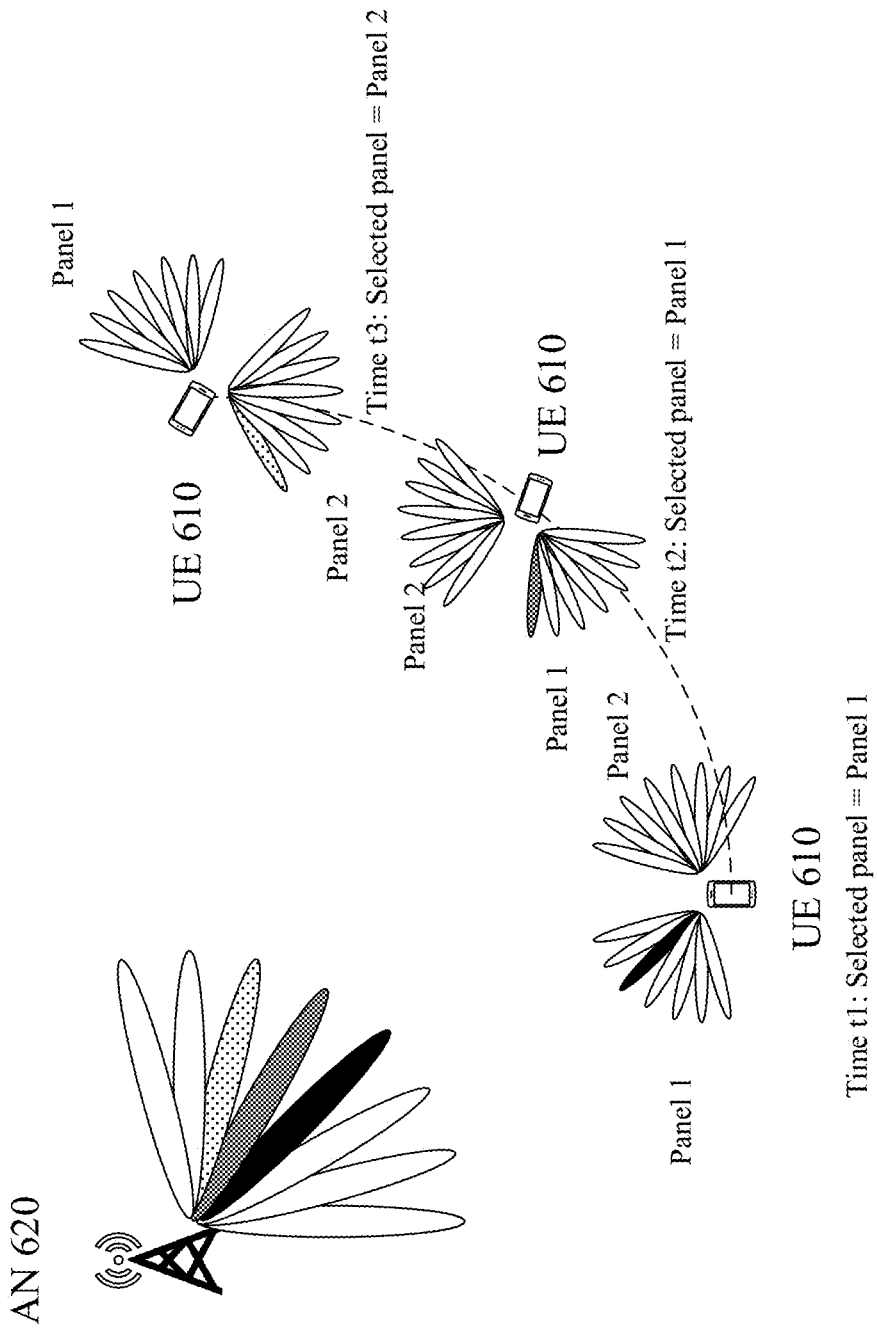
FIG. 6 illustrates a schematic diagram showing a scene of UE panel selection in accordance with some embodiments of the disclosure.

As mentioned above, under MIMO communication circumstances, a UE (e.g., the UE 101 of FIG. 1) may include one or more antenna port(s) groups, each of which may be considered as a panel. FIG. 6 shows a schematic diagram illustrating a scene 600 of UE panel selection in accordance with some embodiments of the disclosure.

As shown in FIG. 6, a UE 610 includes two panels, Panel 1 and Panel 2. It should be noted that the quantity of panels shown in FIG. 6 is for demonstrative purposes only. In practice, the UE may have any proper number of panels, such as, 1 panel, 3 panels, 4 panels, and so on. Different panels of the UE may target to different directions. Therefore, with rotation or movement of the UE, the best panel for uplink transmission may change. In the illustrative scene 600, the UE 610 is communicatively connected with an AN 620 (e.g., the ANs 111 or 112 of FIG. 1). At time t1 and t2, Panel 1 is selected for uplink transmission. In that case, the UE 610 may deactivate Panel 2 in order to save power. With rotation and/or movement of the UE 610, at time t3, Panel 1 is no longer optimal for the communication with the AN 620, and Panel 2 becomes the optimal panel for uplink transmission. Then, at time t3, the UE 610 may deactivate Panel 1 and activate Panel 2, which may involve an extra delay. In scene 600, it is necessary to maintain the same understanding between the UE 610 and the AN 620 whether each of the UE panels is deactivated or activated Embodiments of the present disclosure provide, for example but not limited to, solutions to maintain the same understanding of activation/deactivation status of each panel of a UE between the UE and an AN (e.g., a gNB) and solutions for the AN to schedule a panel of the UE taking the activation/deactivation status of the panel into consideration.

Figure 7:
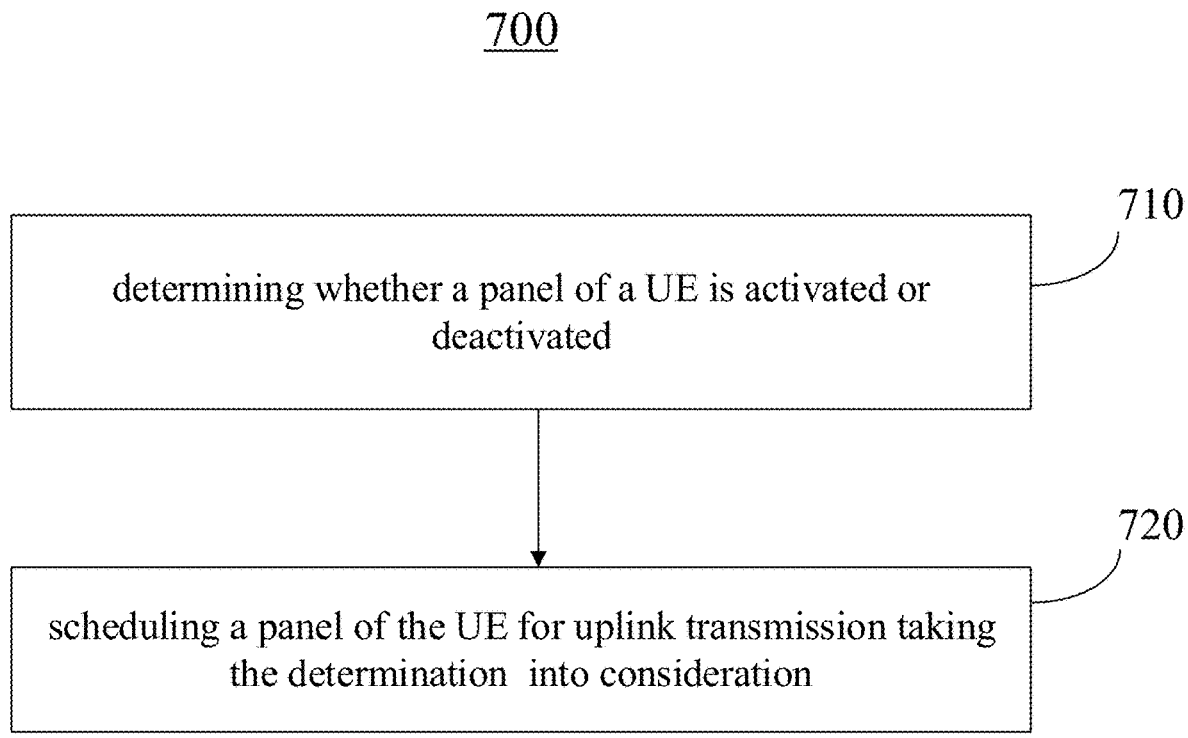
FIG. 7 illustrates a flowchart of a method for UE panel selection in accordance with some embodiments of the disclosure.

Referring to FIG. 7, illustrated is a flowchart of a method 700 for UE panel selection, in accordance with various embodiments of the disclosure. In some aspects, the method 700 can be performed by the ANs 111 or 112 of FIG. 1. In other aspects, a machine-readable storage medium may store instructions associated with method 700, which when executed can cause an AN or a gNB to perform the method 700.

The method 700 may include, at 710, determining whether a panel of a UE (which may include one or more panels) is activated or deactivated, based on communication between the UE and the AN in a particular time duration.

In some respects, the AN may determine whether a panel of the UE is activated or deactivated based on any of the following:
  whether an identifier (ID) of the panel is configured in a RRC signaling or a media access control (MAC) control element (CE) for any uplink channel or signal, including a PUSCH, a physical uplink control channel (PUCCH), an SRS or a PRACH etc.;
  whether there is an uplink signal transmitted from or scheduled for the panel within a number of slots before the current slot; or
  whether there is a beam reporting instance associated with the panel received within a number of slots before the current slot.

In an embodiment, if the ID of the panel is configured in a RRC signaling or an MAC CE for an uplink channel or signal, the AN may determine the panel of the UE as activated; or otherwise, deactivated.

In another embodiment, if there is an uplink signal transmitted from or scheduled for the panel within a number of slots before the current slot, the AN may determine the panel of the UE as activated; or otherwise, deactivated.

In yet another embodiment, if there is a beam reporting instance associated with the panel received within a number of slots before the current slot, the AN may determine the panel of the UE as activated; or otherwise, deactivated.

In the embodiments, the number of slots may be configured by a higher layer signaling, such as, a RRC signaling. Alternatively, the number of slots may be configured based on UE capability of the UE.

In other respects, the AN may determine whether a panel of the UE is activated or deactivated in accordance with activation/deactivation status of each UE panel as reported by the UE. For example, the UE may report the activation/deactivation status of each UE panel by a PUSCH, a PUCCH or an MAC CE.

The method 700 may include, at 720, scheduling a panel of the UE for uplink transmission taking the determination at 710 into consideration. In embodiments, when scheduling a panel of the UE, a scheduling offset related to the activation/deactivation status of the particular panel may be applied.

Figures 8, 9:
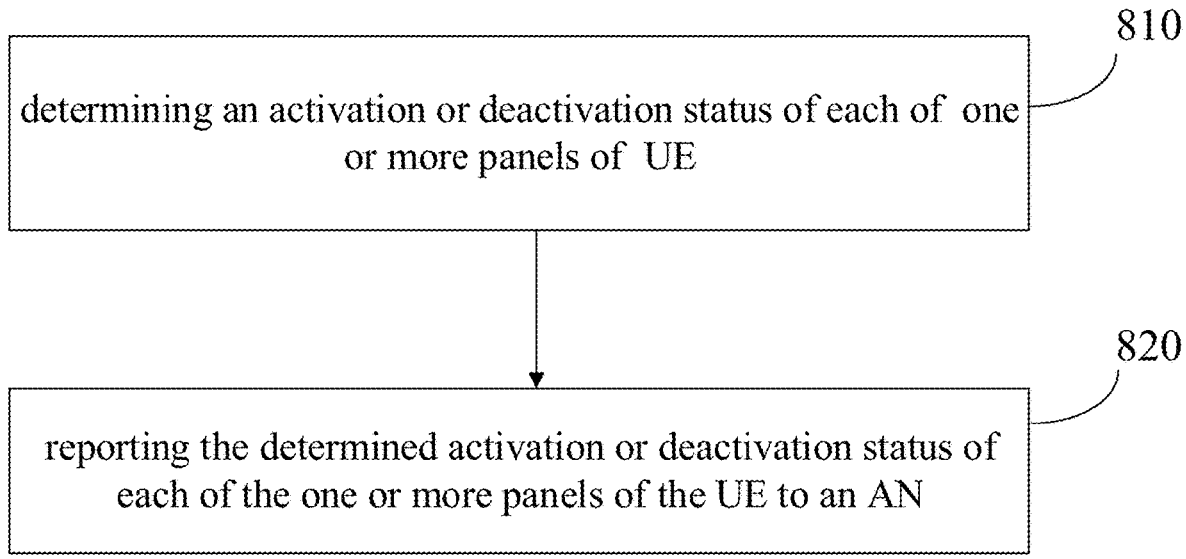
FIG. 8 illustrates a flowchart of a method for UE panel selection in accordance with some embodiments of the disclosure.
FIG. 9 illustrates an example of a bitmap for indicating activation/deactivation status of UE panels in accordance with various embodiments of the disclosure.

Referring to FIG. 8, illustrated is a flowchart of a method 800 for UE panel selection, in accordance with various embodiments of the disclosure. In some aspects, the method 800 can be performed by the UE 101 of FIG. 1. In other aspects, a machine-readable storage medium may store instructions associated with method 800, which when executed can cause a UE to perform the method 800. In embodiments, the UE may include one or more panels.

The method 800 may include, at 810, determining an activation or deactivation status of each of the one or more panels of the UE.

The method 800 may include, at 820, reporting the determined activation or deactivation status of each of the one or more panels of the UE to an AN (e.g., the ANs 111 or 112 of FIG. 1).

In an embodiment, the UE may report the determined activation or deactivation status of each of the one or more panels of the UE by a PUSCH, a PUCCH or an MAC CE. For example, the UE may report the determined activation or deactivation status of each of the one or more panels of the UE in an implicit manner by beam reporting, such as, the beam reporting procedure as discussed with regard to FIG. 2. As mentioned above, the UE may report beam quality of each of one or more reference signal resources and corresponding panel for receiving each of the one or more reference signal resources by beam reporting. In that case, the beam reporting may include indexes of one or more of the one or more panels of the UE. Therefore, the AN may consider panel(s) for which the indexes have not been included in the beam reporting as deactivated.

In another embodiment, the UE may report the determined activation or deactivation status of each of the one or more panels of the UE using a bitmap. The bitmap may include one or more bits corresponding to the one or more panels of the UE, each of which is may indicate the activation or deactivation status of the corresponding panel. FIG. 9 shows an example of a bitmap 900 for indicating activation/deactivation status of UE panels in accordance with various embodiments of the disclosure.

As shown in FIG. 9, the bitmap 900 includes two bits corresponding to two panels of the UE, i.e., Panel 1 and Panel 2. In the bitmap, "10" means Panel 1 is activated and Panel 2 is deactivated, "01" means Panel 1 is deactivated and Panel 2 is activated, "11" means both Panel 1 and Panel 2 are activated, and "00" means both Panel 1 and Panel 2 are deactivated. It should be noted that the number of bits of the bitmap 900 is for demonstrative purposes only. In practice, the bitmap 900 may include any proper number of bits as determined by the particular number of panels of the UE.

The UE may report the determined activation or deactivation status of each of the one or more panels of the UE in a periodic manner, a semi-persistent manner or an aperiodic manner, which may be triggered or configured by a RRC signaling, a MAC CE or downlink control information (DCI).

In a scenario where a panel of the UE becomes activated from the deactivation status, the UE may trigger a PRACH procedure to report a beam for the panel. In the scenario, the PRACH is transmitted from the panel. For example, the PRACH may be a contention based PRACH or a contention-free PRACH, which may be configured by a higher layer signaling.

A delay would be involved in a process of UE panel selection. A minimal delay for UE panel selection may have association with the activation/deactivation status of a panel to be scheduled. For example, when the panel to be scheduled is in the deactivation status, a larger delay would be expected.

In an embodiment, when reporting UE capabilities, a UE may report its capability of minimal delay to activate a panel for uplink transmission, for example, a minimal delay to activate a panel from the deactivation status. For example, the UE may report the minimal scheduling offset for an SRS, a PUSCH or a PRACH in case that a panel in the deactivation status is scheduled for uplink transmission. For example, when a panel in the deactivation status is scheduled for uplink transmission, the UE may report a minimal offset to transmit a hybrid automatic repeat request (HARQ) acknowledgement (ACK) by a physical uplink control channel (PUCCH) from the panel.

In an embodiment, a scheduling offset for an AN to trigger corresponding uplink signal from a panel in the deactivation status should be above the minimal delay that the UE has reported.

In an embodiment, a first minimal scheduling offset to be used for a panel in the activation status and a second minimal scheduling offset to be used for a panel in the deactivation status may be predefined, for example, in corresponding 3GPP specifications. In the embodiment, the second minimal scheduling offset may be larger than the first minimal scheduling offset.

Figure 10:
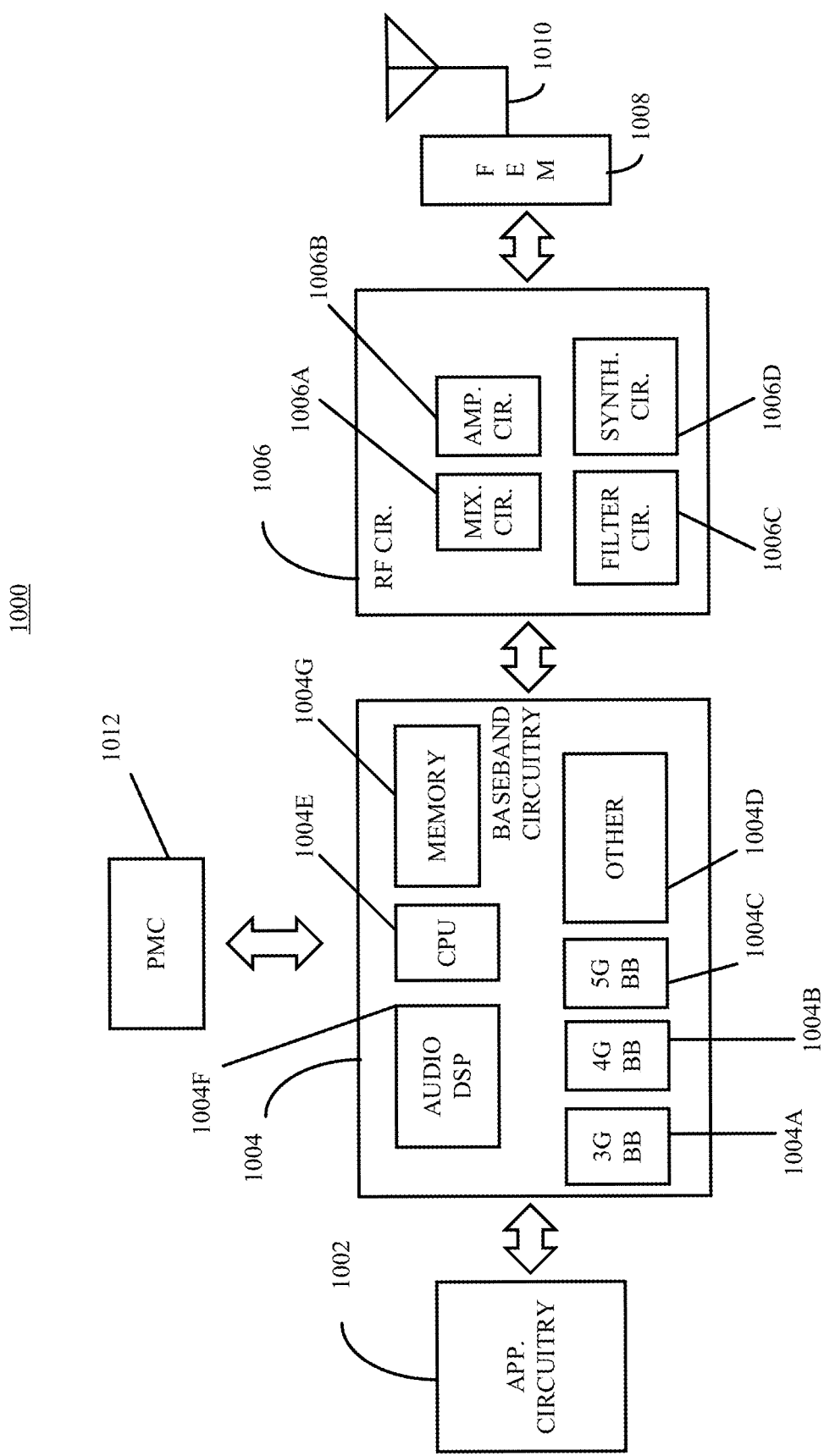
FIG. 10 illustrates example components of a device in accordance with some embodiments of the disclosure.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or an AN. In some embodiments, the device 1000 may include less elements (e.g., an AN may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., sixth generation (6G), etc.). The baseband circuitry 1004 (e.g., one or more of baseband processors 1004A-D) may handle various radio control functions that enable communication with one or more radio networks via the RF circuitry 1006. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006*a*, amplifier circuitry 1006*b* and filter circuitry 1006*c*. In some embodiments, the transmit signal path of the RF circuitry 1006 may include filter circuitry 1006*c* and mixer circuitry 1006*a*. RF circuitry 1006 may also include synthesizer circuitry 1006*d* for synthesizing a frequency for use by the mixer circuitry 1006*a* of the receive signal path and the transmit signal path. In some embodiments, the mixer circuitry 1006*a* of the receive signal path may be configured to down-convert RF signals received from the FEM circuitry 1008 based on the synthesized frequency provided by synthesizer circuitry 1006*d*. The amplifier circuitry 1006*b* may be configured to amplify the down-converted signals and the filter circuitry 1006*c* may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006*a* of the receive signal path may comprise passive mixers, although the scope of the embodiments is not limited in this respect.

In some embodiments, the mixer circuitry 1006*a* of the transmit signal path may be configured to up-convert input baseband signals based on the synthesized frequency provided by the synthesizer circuitry 1006*d* to generate RF output signals for the FEM circuitry 1008. The baseband signals may be provided by the baseband circuitry 1004 and may be filtered by filter circuitry 1006*c*.

In some embodiments, the mixer circuitry 1006*a* of the receive signal path and the mixer circuitry 1006*a* of the transmit signal path may include two or more mixers and may be arranged for quadrature downconversion and upconversion, respectively. In some embodiments, the mixer circuitry 1006*a* of the receive signal path and the mixer circuitry 1006*a* of the transmit signal path may include two or more mixers and may be arranged for image rejection (e.g., Hartley image rejection). In some embodiments, the mixer circuitry 1006*a* of the receive signal path and the mixer circuitry 1006*a* of the transmit signal path may be arranged for direct downconversion and direct upconversion, respectively. In some embodiments, the mixer circuitry 1006*a* of the receive signal path and the mixer circuitry 1006*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006*d* may be a fractional-N synthesizer or a fractional N/N+1 synthesizer, although the scope of the embodiments is not limited in this respect as other types of frequency synthesizers may be suitable. For example, synthesizer circuitry 1006*d* may be a delta-sigma synthesizer, a frequency multiplier, or a synthesizer comprising a phase-locked loop with a frequency divider.

The synthesizer circuitry 1006*d* may be configured to synthesize an output frequency for use by the mixer circuitry 1006*a* of the RF circuitry 1006 based on a frequency input and a divider control input. In some embodiments, the synthesizer circuitry 1006*d* may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006*d* of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 1012 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it may transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a RRC layer. As referred to herein, Layer 2 may comprise a medium access control (MAC) layer, a radio link control (RLC) layer, and a packet data convergence protocol (PDCP) layer. As referred to herein, Layer 1 may comprise a physical (PHY) layer of a UE/RAN node.

Figure 11:
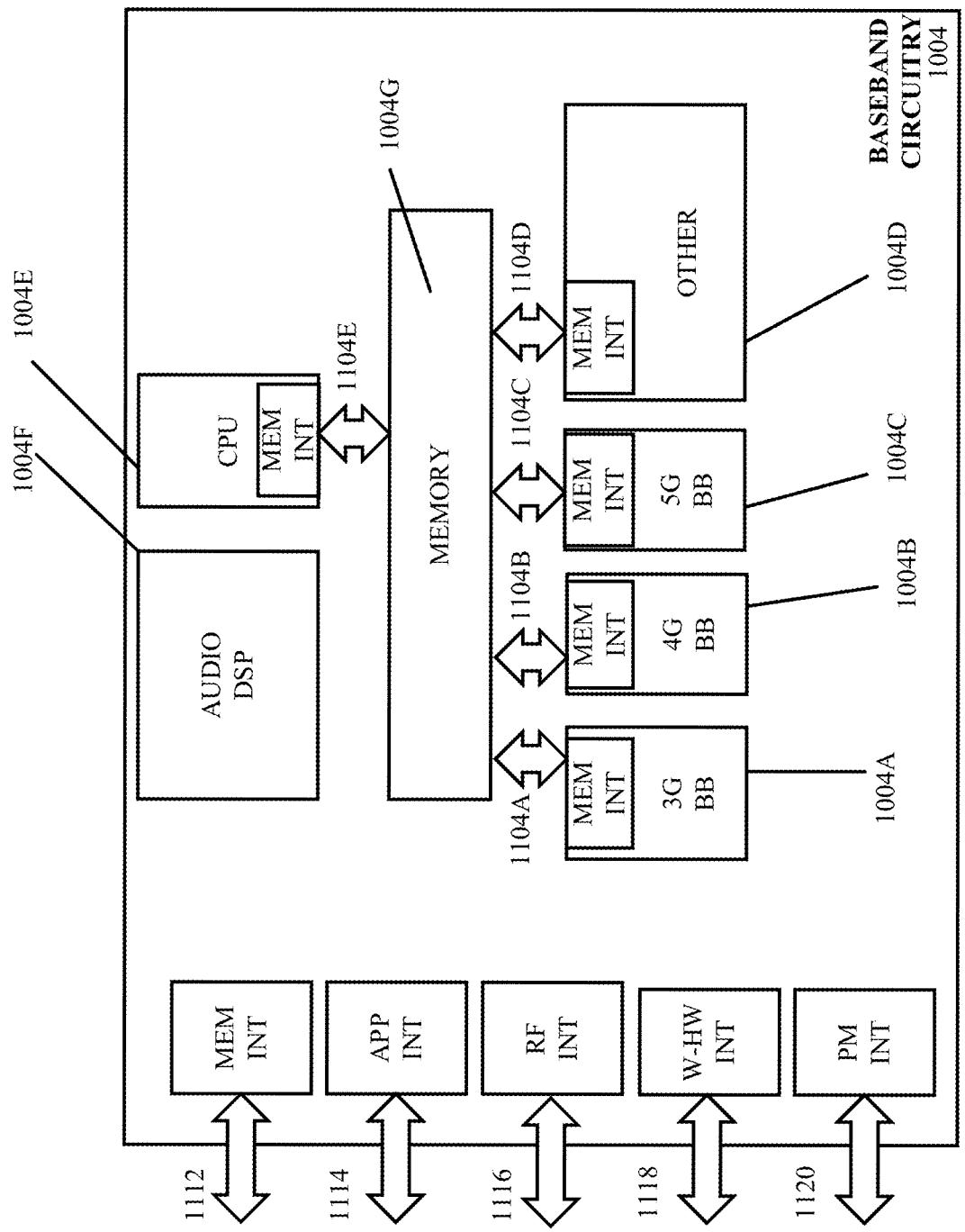
FIG. 11 illustrates example interfaces of baseband circuitry in accordance with some embodiments of the disclosure.

FIG. 11 illustrates example interfaces of baseband circuitry in accordance with some embodiments. As discussed above, the baseband circuitry 1004 of FIG. 10 may comprise processors 1004A-1004E and a memory 1004G utilized by said processors. Each of the processors 1004A-1004E may include a memory interface, 1104A-1104E, respectively, to send/receive data to/from the memory 1004G.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

Figure 12:
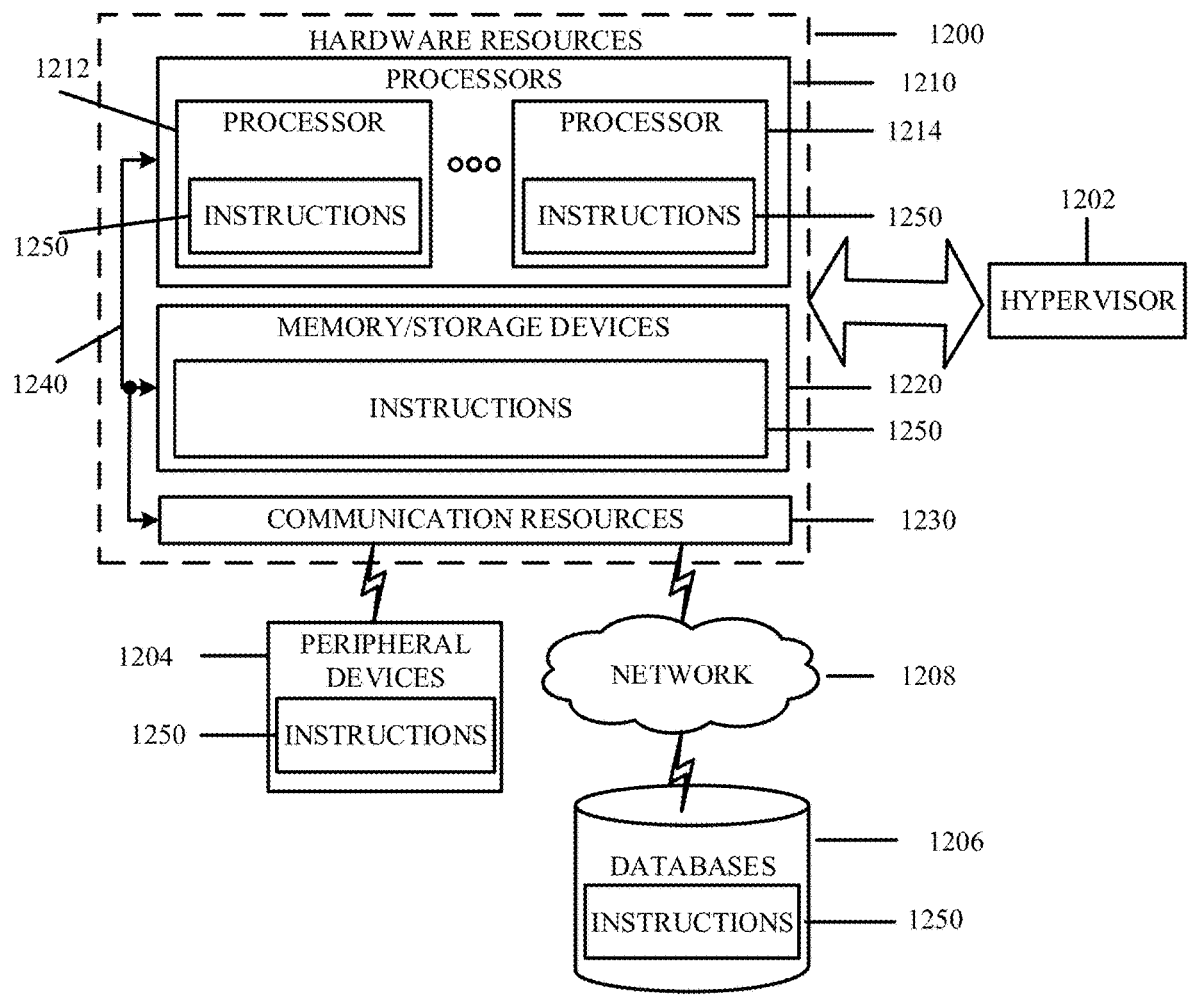
FIG. 12 is a block diagram illustrating components, in accordance with some embodiments of the disclosure, able to read instructions from a machine-readable or computer-readable medium and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

The following pertains to further embodiments of the disclosure.

Example 1 includes an apparatus for a user equipment (UE), comprising: a radio frequency (RF) interface to receive one or more reference signal resources from a next generation NodeB (gNB); and processor circuitry coupled with the RF interface, the processor circuitry to: determine a beam quality for each of the one or more reference signal resources received at each panel of the UE; and report beam information to the gNB, the beam information to indicate the beam quality of each of the one or more reference signal resources and corresponding panel for receiving each of the one or more reference signal resources.

Example 2 may include the apparatus of example 1, wherein the one or more reference signal resources are to include synchronization signal block (SSB) resources or channel state information reference signal (CSI-RS) resources.

Example 3 may include the apparatus of examples 1 or 2, wherein the beam information is to include one or more information elements (IEs), each of the IEs is to include an SSB resource index (SSBRI) or a CSI-RS resource index (CRI), an index of a panel for receiving the corresponding SSB resource or CSI-RS resource, and a beam quality of the SSB resource or CSI-RS resource as received at the panel.

Example 4 may include the apparatus of example 3, wherein the index of the panel is based on a bitmap or indicated by a higher layer signaling.

Example 5 may include the apparatus of any of examples 1-4, wherein the processor circuitry is to determine the beam quality for each of the one or more reference signal resources received at each panel of the UE based on a Layer 1 Reference Signal Receiving Received Power (L1-RSRP), a Layer 1 Signal to Interference plus Noise Ratio (L1-SINR), or a Layer 1 Reference Signal Received Quality (L1-RSRQ).

Example 6 may include the apparatus of any of examples 1-5, wherein the processor circuitry is further to update a panel for corresponding uplink transmission based on the beam information after a number of lots from the reporting, wherein the number of the slots is configured by a higher layer signaling or predefined.

Example 7 may include the apparatus of any of examples 1-6, wherein the processor circuitry is further to decode a beam indication received from the gNB, the beam indication to indicate a reference signal resource of the one or more reference signal resources.

Example 8 may include the apparatus of example 7, wherein the beam indication is to include an SSB resource index (SSBRI) or a CSI-RS resource index (CRI).

Example 9 may include the apparatus of example 7, wherein the processor circuitry is further to apply a panel for uplink transmission, wherein the panel corresponds to the indicated reference signal resource as indicated in the reported beam information.

Example 10 may include the apparatus of example 7, wherein the beam indication is in a format of a downlink reference signal including a *PUCCH-SpatialRelationInfo* information element (IE), the *PUCCH-SpatialRelationInfo* IE is to indicate an SSB resource index (SSBRI) or a CSI-RS resource index (CRI), and an index of UE panel.

Example 11 may include the apparatus of example 10, wherein the processor circuitry is to apply a panel for uplink transmission, based on the index of UE panel.

Example 12 includes an apparatus for a next generation NodeB (gNB), comprising: a radio frequency (RF) interface to transmit one or more reference signal resources to a user equipment (UE); and processor circuitry coupled with the RF interface, the processor circuitry to: decode beam information received from the UE, the beam information to indicate a beam quality of each of the one or more reference signal resources as received at a UE panel and the corresponding UE panel for receiving each of the one or more reference signal resources; and encode a beam indication based on the received beam information, the beam indication to indicate a reference signal resource of the one or more reference signal resources.

Example 13 may include the apparatus of example 12, wherein the one or more reference signal resources are to include synchronization signal block (SSB) resources or channel state information reference signal (CSI-RS) resources.

Example 14 may include the apparatus of examples 12 or 13, wherein the beam information is to include one or more information elements (IEs), each of the IEs is to include an SSB resource index (SSBRI) or a CSI-RS resource index (CRI), an index of a UE panel for receiving the corresponding SSB resource or CSI-RS resource, and a beam quality of the SSB resource or CSI-RS resource as received at the UE panel.

Example 15 may include the apparatus of any of examples 12-14, wherein the beam indication is to include an SSB resource index (SSBRI) or a CSI-RS resource index (CRI).

Example 16 may include the apparatus of any of examples 12-15, wherein the beam indication is in a format of a downlink reference signal including a *PUCCH-SpatialRelationInfo* information element (IE), the *PUCCH-SpatialRelationInfo* IE is to indicate an SSB resource index (SSBRI) or a CSI-RS resource index (CRI), and an index of corresponding UE panel.

Example 17 may include a non-transitory computer-readable storage medium having instructions stored thereon, which when executed by a next generation NodeB (gNB), cause the gNB to determine whether a panel of a user equipment (UE) is activated or deactivated based on communications with the UE; and schedule a panel of the UE for uplink transmission taking the determination into consideration.

Example 18 may include the non-transitory computer-readable storage medium of example 17, wherein the gNB is to determine whether a panel of the UE is activated or deactivated based on: whether an identifier (ID) of the panel is configured in a radio resource control (RRC) signaling or a media access control (MAC) control element (CE) for any uplink channel or signal; whether there is an uplink signal transmitted from or scheduled for the panel within a number of slots before the current slot; or whether there is a beam reporting instance associated with the panel received within a number of slots before the current slot, wherein the number of slots is predefined, configured by a higher layer signaling, or based on UE capability of the UE.

Example 19 may include the non-transitory computer-readable storage medium of examples 17 or 18, wherein the gNB circuitry is to determine the panel as activated, if the ID of the panel is configured in a RRC signaling or an MAC CE for an uplink channel or signal; or otherwise, the gNB is to determine the panel as deactivated.

Example 20 may include the non-transitory computer-readable storage medium of examples 17 or 18, wherein the gNB is to determine the panel as activated, if there is an uplink signal transmitted from or scheduled for the panel within a number of slots before the current slot; or otherwise, the gNB is to determine the panel as deactivated.

Example 21 may include the non-transitory computer-readable storage medium of examples 17 or 18, wherein the gNB is to determine the panel as activated, if there is a beam reporting instance associated with the panel received within a number of slots before the current slot; or otherwise, the gNB is to determine the panel as deactivated.

Example 22 may include the non-transitory computer-readable storage medium of examples 17-21, wherein the instructions when executed by the gNB, further cause the gNB to apply a scheduling offset to schedule the panel of the UE, wherein the scheduling offset is related to whether the scheduled panel is activated or deactivated.

Example 23 may include the non-transitory computer-readable storage medium of example 17, wherein the gNB circuitry is to determine whether a panel of the UE is activated or deactivated based on an activation or deactivation status of the panel as reported by the UE.

Example 24 may include the non-transitory computer-readable storage medium of example 23, wherein the activation or deactivation status of the panel is reported by the UE in an implicit manner by beam reporting, wherein the beam reporting is to include an index of the panel in case that the panel is activated.

Example 25 may include the non-transitory computer-readable storage medium of example 23, wherein the activation or deactivation status of the panel is reported by the UE in a bitmap, wherein the bitmap is to include one or more bits corresponding to the one or more panels of the UE, each of the one or more bits is to indicate the activation or deactivation status of a corresponding panel.

Example 26 includes an apparatus for a user equipment (UE), comprising: a radio frequency (RF) interface; and processor circuitry coupled with the RF interface, the processor circuitry to: determine an activation or deactivation status of each of one or more panels of the UE; and report, via the RF interface, the activation or deactivation status of each of the one or more panels of the UE, to a next generation NodeB (gNB).

Example 27 may include the apparatus of example 26, wherein the processor circuitry is to report the activation or deactivation status of each of the one or more panels of the UE in an implicit manner by beam reporting, wherein the beam reporting is to include indexes of one or more of the one or more panels of the UE.

Example 28 may include the apparatus of example 26, wherein the processor circuitry is to report the activation or deactivation status of each of the one or more panels of the UE using a bitmap, wherein the bitmap is to include one or more bits corresponding to the one or more panels of the UE, each of the one or more bits is to indicate the activation or deactivation status of the corresponding panel.

Example 29 may include the apparatus of example 26, wherein the processor circuitry is to report the activation or deactivation status of each of the one or more panels of the UE in one of a periodic, semi-persistent or aperiodic manner, as triggered or configured by a radio resource control (RRC) signaling, a media access control (MAC) control element (CE) or downlink control information (DCI).

Example 30 may include the apparatus of any of examples 26-29, wherein the processor circuitry is further to, when a panel is activated from the deactivation status, trigger a physical random access channel (PRACH) to report a beam for the panel, wherein the PRACH is to be transmitted via the panel.

Example 31 may include the apparatus of example 30, wherein the PRACH is a contention based PRACH or a contention-free PRACH, according to a configuration by a higher layer signaling.

Example 32 may include the apparatus of any of examples 26-31, wherein the processor circuitry is to report, to the gNB, a minimal delay to activate a panel from the deactivation status.

Example 33 may include the apparatus of any of examples 26-32, wherein the processor circuitry is to report, to the gNB, a minimal scheduling offset for a sounding reference signal (SRS), a physical uplink shared channel (PUSCH) or a physical random access channel (PRACH), in case that a panel in the deactivation status is scheduled for uplink transmission.

Example 34 may include the apparatus of any of examples 26-33, wherein the processor circuitry is to, when a panel in the deactivation status is scheduled for uplink transmission, report, to the gNB, a minimal offset to transmit a hybrid automatic repeat request (HARQ) acknowledgement (ACK) by a physical uplink control channel (PUCCH) from the panel.

Example 35 may include the apparatus of any of examples 26-34, wherein a first minimal scheduling offset to be used for a panel in the activation status and a second minimal scheduling offset to be used for a panel in the deactivation status are predefined, wherein the second minimal scheduling offset is larger than the first minimal scheduling offset.

Example 36 includes a method to be performed by a UE, comprising: determining a beam quality for each of one or more reference signal resources received from an access node (AN) at each panel of the UE; and reporting beam information to the AN, the beam information to indicate the beam quality of each of the one or more reference signal resources and corresponding panel for receiving each of the one or more reference signal resources.

Example 37 may include the method of example 36 wherein the one or more reference signal resources are to include synchronization signal block (SSB) resources or channel state information reference signal (CSI-RS) resources.

Example 38 may include the method of examples 36 or 37, wherein the beam information is to include one or more information elements (IEs), each of the IEs is to include an SSB resource index (SSBRI) or a CSI-RS resource index (CRI), an index of a panel for receiving the corresponding SSB resource or CSI-RS resource, and a beam quality of the SSB resource or CSI-RS resource as received at the panel.

Example 39 may include the method of example 38, wherein the index of the panel is based on a bitmap or indicated by a higher layer signaling.

Example 40 may include the method of any of examples 36-39, further comprising: determining the beam quality for each of the one or more reference signal resources received at each panel of the UE based on a Layer 1 Reference Signal Received Power (L1-RSRP), a Layer 1 Signal to Interference plus Noise Ratio (L1-SINR), or a Layer 1 Reference Signal Received Quality (L1-RSRQ).

Example 41 may include the method of any of examples 36-39, further comprising: updating a panel for corresponding uplink transmission based on the beam information after a number of lots from the reporting, wherein the number of the slots is configured by a higher layer signaling or predefined.

Example 42 may include the method of any of examples 36-40, further comprising: decoding a beam indication received from the AN, the beam indication to indicate a reference signal resource of the one or more reference signal resources.

Example 43 may include the method of example 42, wherein the beam indication is to include an SSB resource index (SSBRI) or a CSI-RS resource index (CRI).

Example 44 may include the method of example 42, further comprising: applying a panel for uplink transmission, wherein the panel corresponds to the indicated reference signal resource as indicated in the reported beam information.

Example 45 may include the method of example 42, wherein the beam indication is in a format of a downlink reference signal including a *PUCCH-SpatialRelationInfo* information element (IE), the *PUCCH-SpatialRelationInfo* IE is to indicate an SSB resource index (SSBRI) or a CSI-RS resource index (CRI), and an index of UE panel.

Example 46 may include the method of example 45, further comprising: applying a panel for uplink transmission, based on the index of UE panel.

Example 47 includes a method to be performed by an access node (AN), comprising: decoding beam information received from a user equipment (UE), the beam information to indicate: a beam quality of each of one or more reference signal resources as transmitted from the AN and received at a UE panel, and the corresponding UE panel for receiving each of the one or more reference signal resources; and encoding a beam indication based on the received beam information, the beam indication to indicate a reference signal resource of the one or more reference signal resources.

Example 48 may include the method of example 47, wherein the one or more reference signal resources are to include synchronization signal block (SSB) resources or channel state information reference signal (CSI-RS) resources.

Example 49 may include the method of examples 47 or 48, wherein the beam information is to include one or more information elements (IEs), each of the IEs is to include an SSB resource index (SSBRI) or a CSI-RS resource index (CRI), an index of a UE panel for receiving the corresponding SSB resource or CSI-RS resource, and a beam quality of the SSB resource or CSI-RS resource as received at the UE panel.

Example 50 may include the method of any of examples 47-49, wherein the beam indication is to include an SSB resource index (SSBRI) or a CSI-RS resource index (CRI).

Example 51 may include the method of any of examples 47-50, wherein the beam indication is in a format of a downlink reference signal including a *PUCCH-SpatialRelationInfo* information element (IE), the *PUCCH-SpatialRelationInfo* IE is to indicate an SSB resource index (SSBRI) or a CSI-RS resource index (CRI), and an index of corresponding UE panel.

Example 52 includes a method to be performed by an access node (AN), comprising: determining whether a panel of a user equipment (UE) is activated or deactivated based on communications with the UE; and scheduling a panel of the UE for uplink transmission taking the determination into consideration.

Example 53 may include the method of example 52, comprising: determining whether a panel of the UE is activated or deactivated based on: whether an identifier (ID) of the panel is configured in a radio resource control (RRC) signaling or a media access control (MAC) control element (CE) for any uplink channel or signal; whether there is an uplink signal transmitted from or scheduled for the panel within a number of slots before the current slot; or whether there is a beam reporting instance associated with the panel received within a number of slots before the current slot, wherein the number of slots is predefined, configured by a higher layer signaling, or based on UE capability of the UE.

Example 54 may include the method of examples 52 or 53, comprising: determining the panel as activated, if the ID of the panel is configured in a RRC signaling or an MAC CE for an uplink channel or signal; or otherwise, determining the panel as deactivated.

Example 55 may include the method of examples 52 or 53, comprising: determining the panel as activated, if there is an uplink signal transmitted from or scheduled for the panel within a number of slots before the current slot; or otherwise, determining the panel as deactivated.

Example 56 may include the method of examples 52 or 53, comprising: determining the panel as activated, if there is a beam reporting instance associated with the panel received within a number of slots before the current slot; or otherwise, determining the panel as deactivated.

Example 57 may include the method of examples 52-56, comprising: applying a scheduling offset to schedule the panel of the UE, the scheduling offset is related to whether the scheduled panel is activated or deactivated.

Example 58 may include the method of example 52, comprising: whether a panel of the UE is activated or deactivated based on an activation or deactivation status of the panel as reported by the UE.

Example 59 may include the method of example 58, wherein the activation or deactivation status of the panel is reported by the UE in an implicit manner by beam reporting, wherein the beam reporting is to include an index of the panel in case that the panel is activated.

Example 60 may include the method of example 58, wherein the activation or deactivation status of the panel is reported by the UE in a bitmap, wherein the bitmap is to include one or more bits corresponding to the one or more panels of the UE, each of the one or more bits is to indicate the activation or deactivation status of a corresponding panel.

Example 61 includes a method to be performed by a user equipment (UE), comprising: determining an activation or deactivation status of each of one or more panels of the UE; and reporting the activation or deactivation status of each of the one or more panels of the UE, to an access node (AN).

Example 62 may include the method of example 61, comprising: reporting the activation or deactivation status of each of the one or more panels of the UE in an implicit manner by beam reporting, wherein the beam reporting is to include indexes of one or more of the one or more panels of the UE.

Example 63 may include the method of example 61, comprising: reporting the activation or deactivation status of each of the one or more panels of the UE using a bitmap, wherein the bitmap is to include one or more bits corresponding to the one or more panels of the UE, each of the one or more bits is to indicate the activation or deactivation status of the corresponding panel.

Example 64 may include the method of example 61, comprising: reporting the activation or deactivation status of each of the one or more panels of the UE in one of a periodic, semi-persistent or aperiodic manner, as triggered or configured by a radio resource control (RRC) signaling, a media access control (MAC) control element (CE) or downlink control information (DCI).

Example 65 may include the method of any of examples 61-64, further comprising: when a panel is activated from the deactivation status, triggering a physical random access channel (PRACH) to report a beam for the panel, wherein the PRACH is to be transmitted via the panel.

Example 66 may include the method of example 65, wherein the PRACH is a contention based PRACH or a contention-free PRACH, according to a configuration by a higher layer signaling.

Example 67 may include the method of any of examples 61-66, comprising: reporting, to the AN, a minimal delay to activate a panel from the deactivation status.

Example 68 may include the method of any of examples 61-67, comprising: reporting, to the AN, a minimal scheduling offset for a sounding reference signal (SRS), a physical uplink shared channel (PUSCH) or a physical random access channel (PRACH), in case that a panel in the deactivation status is scheduled for uplink transmission.

Example 69 may include the method of any of examples 61-68, comprising: when a panel in the deactivation status is scheduled for uplink transmission, reporting, to the AN, a minimal offset to transmit a hybrid automatic repeat request (HARQ) acknowledgement (ACK) by a physical uplink control channel (PUCCH) from the panel.

Example 70 may include the method of any of examples 61-69, wherein a first minimal scheduling offset to be used for a panel in the activation status and a second minimal scheduling offset to be used for a panel in the deactivation status are predefined, wherein the second minimal scheduling offset is larger than the first minimal scheduling offset.

Example 71 includes a non-transitory computer-readable storage medium having instructions stored thereon, which when executed by a user equipment (UE), cause the UE to perform a method according to any of examples 36-46.

Example 72 includes an apparatus to be applied in a user equipment (UE), comprising means for performing a method according to any of examples 36-46.

Example 73 includes a non-transitory computer-readable storage medium having instructions stored thereon, which when executed by an access node (AN), cause the AN to perform a method according to any of examples 47-51.

Example 74 includes an apparatus to be applied in an access node (AN), comprising means for performing a method according to any of examples 47-51.

Example 75 includes a non-transitory computer-readable storage medium having instructions stored thereon, which when executed by an access node (AN), cause the AN to perform a method according to any of examples 52-60.

Example 76 includes an apparatus to be applied in an access node (AN), comprising means for performing a method according to any of examples 52-60.

Example 77 includes a non-transitory computer-readable storage medium having instructions stored thereon, which when executed by a user equipment (UE), cause the UE to perform a method according to any of examples 61-70.

Example 78 includes an apparatus to be applied in a user equipment (UE), comprising means for performing a method according to any of examples 61-70.

Example 79 includes an apparatus for a next generation NodeB (gNB), comprising: a radio frequency (RF) interface to communicate with a user equipment (UE); and processor circuitry coupled with the RF interface, the processor circuitry to: determine whether a panel of the UE is activated or deactivated based on the communication with the UE; and schedule a panel of the UE for uplink transmission taking the determination into consideration.

Example 80 may include the apparatus of example 79, wherein the gNB is to determine whether a panel of the UE is activated or deactivated based on: whether an identifier (ID) of the panel is configured in a radio resource control (RRC) signaling or a media access control (MAC) control element (CE) for any uplink channel or signal; whether there is an uplink signal transmitted from or scheduled for the panel within a number of slots before the current slot; or whether there is a beam reporting instance associated with the panel received within a number of slots before the current slot, wherein the number of slots is predefined, configured by a higher layer signaling, or based on UE capability of the UE.

Example 81 may include the apparatus of examples 79 or 80, wherein the gNB circuitry is to determine the panel as activated, if the ID of the panel is configured in a RRC signaling or an MAC CE for an uplink channel or signal; or otherwise, the gNB is to determine the panel as deactivated.

Example 82 may include the apparatus of examples 79 or 80, wherein the gNB is to determine the panel as activated, if there is an uplink signal transmitted from or scheduled for the panel within a number of slots before the current slot; or otherwise, the gNB is to determine the panel as deactivated.

Example 83 may include the apparatus of examples 79 or 80, wherein the gNB is to determine the panel as activated, if there is a beam reporting instance associated with the panel received within a number of slots before the current slot; or otherwise, the gNB is to determine the panel as deactivated.

Example 84 may include the apparatus of examples 79-83, wherein the processor circuitry is to apply a scheduling offset to schedule the panel of the UE, the scheduling offset is related to whether the scheduled panel is activated or deactivated.

Example 85 may include the apparatus of example 79, wherein the processor circuitry is to determine whether a panel of the UE is activated or deactivated based on an activation or deactivation status of the panel as reported by the UE.

Example 86 may include the n apparatus of example 85, wherein the activation or deactivation status of the panel is reported by the UE in an implicit manner by beam reporting, wherein the beam reporting is to include an index of the panel in case that the panel is activated.

Example 87 may include the apparatus of example 85, wherein the activation or deactivation status of the panel is reported by the UE in a bitmap, wherein the bitmap is to include one or more bits corresponding to the one or more panels of the UE, each of the one or more bits is to indicate the activation or deactivation status of a corresponding panel.

Example 88 includes a user equipment (UE) as shown and described in the description.

Example 89 includes a n access node (AN) as shown and described in the description.

Example 90 includes a next generation NodeB (gNB) as shown and described in the description.

Example 91 includes a method to be performed by a user equipment (UE) as shown and described in the description.

Example 92 includes a method to be performed by an access node (AN) as shown and described in the description.

Example 93 includes a method to be performed by a next generation NodeB (gNB) as shown and described in the description.

Example 94 includes a communication system, comprising: a user equipment (UE) as shown and described in the description; and a next generation NodeB (gNB) as shown and described in the description.

Example 95 includes a communication system, comprising: a user equipment (UE) as shown and described in the description; and an access node (AN) as shown and described in the description.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Although the foregoing has been described in some details for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skills in the art will appreciate that many changes may be made to the details of the above-described embodiments without departing from the underlying principles. The scope of the present embodiments should, therefore, be determined only by the following claims.

What is claimed is:

1. An apparatus for a user equipment (UE), comprising:
a radio frequency (RF) interface to facilitate transmission or reception of one or more wireless signals; and
processor circuitry coupled with the RF interface, the processor circuitry to:
identify one or more downlink reference signal resources received from a next-generation NodeB (gNB);
measure a beam quality for the one or more downlink reference signal resources received at one or more panels of the UE;
facilitate uplink transmission of one or more information elements (IEs), wherein respective IEs of the one or more IEs include an indication of a reference signal resource of the one or more reference signal resources, an indication of a panel of the one or more panels, and an indication of the measured beam quality of the reference signal resource as received at the panel; and
identify a downlink transmission received from the gNB, wherein the downlink transmission is responsive to the uplink transmission of the one or more IEs, and wherein the downlink transmission includes an indication of an identified panel of the one or more panels that is to be used for transmission of an uplink signal that is responsive to receipt of a future downlink transmission of an identified reference signal resource, wherein the identified panel and the identified reference signal resource are identified by the gNB based on-the-on the one or more IEs.

2. The apparatus of claim 1, wherein the one or more reference signal resources include synchronization signal block (SSB) resources or channel state information reference signal (CSI-RS) resources.

3. The apparatus of claim 2, wherein the downlink transmission includes an indication of an SSB resource index (SSBRI) or a CSI-RS resource index (CRI) that is related to the identified reference signal resource of the one or more reference signal resources.

4. The apparatus of claim 1, wherein the measured beam quality of the reference signal resource as received at the panel is based on a Layer 1 Reference Signal Receiving Received Power (L1-RSRP), a Layer 1 Signal to Interference plus Noise Ratio (L1-SINR), or a Layer 1 Reference Signal Received Quality (L1-RSRQ).

5. The apparatus of claim 1, wherein the indication of the panel of the one or more panels is an index of the panel, and the indication of the reference signal resource of the one or more reference signal resources is an index of the reference signal resource.

6. The apparatus of claim 5, wherein the index of the panel is based on a bitmap or indicated by a higher layer signaling.

7. The apparatus of claim 1, wherein the processor circuitry is to apply the identified panel for the transmission of the uplink signal based on an index of the identified panel.

8. The apparatus of claim 1, wherein the downlink transmission is a downlink reference signal that includes a PUCCH-SpatialRelationInfo IE that includes an indication of the identified reference signal resource.

9. One or more non-transitory computer-readable media (NTCRM) comprising instructions that, upon execution of the instructions by one or more processors of a user equipment (UE), are to cause the UE to:
identify one or more downlink reference signal resources received from a next-generation NodeB (gNB);
measure a beam quality for the one or more downlink reference signal resources received at one or more panels of the UE;
transmit, via uplink transmission, one or more information elements (IEs), wherein respective IEs of the one or more IEs include an indication of a reference signal resource of the one or more reference signal resources, an indication of a panel of the one or more panels, and an indication of the measured beam quality of the reference signal resource as received at the panel; and
identify a downlink transmission received from the gNB, wherein the downlink transmission is responsive to the uplink transmission of the one or more IEs, and wherein the downlink transmission includes an indication of an identified panel of the one or more panels that is to be used for transmission of an uplink signal that is responsive to receipt of a future downlink transmission of an identified reference signal resource, wherein the identified panel and the identified reference signal are identified by the gNB based on the one or more IEs.

10. The one or more NTCRM of claim 9, wherein the one or more reference signal resources include synchronization signal block (SSB) resources or channel state information reference signal (CSI-RS) resources.

11. The one or more NTCRM of claim 9, wherein the indication of the panel of the one or more panels is an index of the panel, and the indication of the reference signal resource of the one or more reference signal resources is an index of the reference signal resource.

12. The one or more NTCRM of claim 9, wherein the measured beam quality of the reference signal resource as received at the panel is based on a Layer 1 Reference Signal Receiving Received Power (L1-RSRP), a Layer 1 Signal to Interference plus Noise Ratio (L1-SINR), or a Layer 1 Reference Signal Received Quality (L1-RSRQ).

13. An apparatus for a gNodeB (gNB), comprising:
a radio frequency (RF) interface to facilitate transmission or reception of one or more wireless signals; and
processor circuitry coupled with the RF interface, the processor circuitry to:
facilitate downlink transmission of one or more reference signal resources to a user equipment (UE) that includes one or more panels, wherein the UE is to measure a beam quality for the one or more downlink reference signal resources received at the one or more panels of the UE;
identify one or more information elements (IEs) received from the UE via uplink transmission, wherein respective IEs of the one or more IEs include an indication of a reference signal resource of the one or more reference signal resources, an indication of a panel of the one or more panels, and an indication of the measured beam quality of the reference signal as received at the panel; and
facilitate transmission of a downlink transmission to the UE, wherein the downlink transmission is responsive to the uplink transmission of the one or more IEs and wherein the downlink transmission includes an indication of an identified panel of the one or more panels that is to be used for transmission of an uplink signal that is responsive to receipt of a future downlink transmission of an identified reference signal resource, wherein the identified panel and the identified reference signal resource are identified by the gNB based on the one or more IEs.

14. The apparatus of claim 13, wherein the indication of the panel of the one or more panels is an index of the panel, and the indication of the reference signal resource of the one or more reference signal resources is an index of the reference signal resource.

15. The apparatus of claim 14, wherein the index of the panel is based on a bitmap or indicated by a higher layer signaling.

16. The apparatus of claim 13, wherein the measured beam quality of the reference signal as received at the panel is based on a Layer 1 Reference Signal Receiving Received Power (L1-RSRP), a Layer 1 Signal to Interference plus Noise Ratio (L1-SINR), or a Layer 1 Reference Signal Received Quality (L1-RSRQ).

17. The apparatus of claim 13, wherein the one or more reference signal resources include synchronization signal block (SSB) resources or channel state information reference signal (CSI-RS) resources.

18. The apparatus of claim 17, wherein the downlink transmission includes an SSB resource index (SSBRI) or a CSI-RS resource index (CRI) that is related to the identified reference signal resource.

19. The apparatus of claim 17, wherein the downlink transmission is a downlink reference signal that includes a PUCCH-SpatialRelationInfo IE that includes an indication of an index of the identified reference signal resource.

20. The apparatus of claim 19, wherein the UE is to apply the identified panel for the transmission of the uplink signal based on an index of the identified panel.

* * * * *

UNITED STATES PATENT AND TRADEMARK OFFICE
CERTIFICATE OF CORRECTION

Page 1 of 1

PATENT NO. : 12,082,022 B2
APPLICATION NO. : 17/252223
DATED : September 3, 2024
INVENTOR(S) : Yushu Zhang et al.

It is certified that error appears in the above-identified patent and that said Letters Patent is hereby corrected as shown below:

In the Claims

Column 29
Claim 1, Line 6, replace "on-the-on" with "on the"

Column 30
Claim 13, Line 33, add a --,-- after "IEs" and before "and"

Signed and Sealed this
Fifteenth Day of July, 2025

Coke Morgan Stewart
*Acting Director of the United States Patent and Trademark Office*